(12) United States Patent
Azima et al.

(10) Patent No.: US 6,760,461 B2
(45) Date of Patent: Jul. 6, 2004

(54) VEHICLE LOUDSPEAKER

(75) Inventors: Henry Azima, Cambridge (GB); Neil Simon Owen, Cambridgeshire (GB); Charles Bream, Cambridgeshire (GB); Christien Ellis, Hertfordshire (GB)

(73) Assignee: New Transducers Limited, London (GB)

( * ) Notice: Subject to any disclaimer, the term of this patent is extended or adjusted under 35 U.S.C. 154(b) by 204 days.

(21) Appl. No.: 09/928,924

(22) Filed: Aug. 14, 2001

(65) Prior Publication Data

US 2002/0025049 A1 Feb. 28, 2002

Related U.S. Application Data

(63) Continuation of application No. PCT/GB00/00405, filed on Feb. 10, 2000.

(30) Foreign Application Priority Data

Feb. 15, 1999 (GB) .............................................. 9903208
Jul. 21, 1999 (GB) .............................................. 9917041

(51) Int. Cl.[7] ............................................ H04R 25/00
(52) U.S. Cl. ........................ 381/389; 381/86; 296/97.1

(58) Field of Search .............................. 296/97.1, 97.2, 296/97.5; D12/187; 381/152, 86, 302, 334, 389, 97.11, 97.12

(56) References Cited

U.S. PATENT DOCUMENTS

| | | | | | |
|---|---|---|---|---|---|
| 3,609,339 | A | * | 9/1971 | Smith | ......................... 362/283 |
| 5,810,420 | A | * | 9/1998 | Welling | ...................... 296/97.5 |
| 6,345,102 | B1 | * | 2/2002 | Davis et al. | .................. 381/86 |
| 6,480,614 | B1 | * | 11/2002 | Denda et al. | ............... 381/423 |

FOREIGN PATENT DOCUMENTS

| | | | | | |
|---|---|---|---|---|---|
| GB | WO 98/16409 | | * | 4/1998 | .................. 381/86 |
| JP | 11215579 A | | * | 8/1999 | |

* cited by examiner

Primary Examiner—Curtis Kuntz
Assistant Examiner—P. Dabney
(74) Attorney, Agent, or Firm—Foley & Lardner LLP

(57) ABSTRACT

A vehicle windscreen accessory comprising a body member, an adjustable support structure for the body member whereby the position of the body member can be adjusted, the body member comprising a mirror member and a loudspeaker having a bending wave panel-form acoustic member, the mirror member and panel-form member being integral. The accessory can be in the form of, e.g., a sun visor or a rear view mirror.

14 Claims, 3 Drawing Sheets

VEHICLE LOUDSPEAKER

This application is a continuation of International Application No. PCT/GB00/00405, filed Feb. 10, 2000, which was published under PCT Article 21 in English on Aug. 17, 2000.

TECHNICAL FIELD

The invention relates to loudspeakers and, more particularly to bending wave panel-form loudspeakers, e.g. resonant panel loudspeakers of the general kind described in International patent application WO97/09842, which describes technology that has come to be known as distributed mode or DM technology. In particular the present invention relates to bending wave panel-form loudspeakers integrated into or attached to vehicle windscreen or windshield accessories, e.g. as in an automobile sun visor or rear view mirror.

BACKGROUND ART

A sun visor for an automobile or other vehicle is generally a hinged flap or panel which at rest is retracted against the roof of the vehicle but which may be moved on a hinge or other mechanism into a position of use to obscure part of the windscreen or windshield to shield the eyes of vehicle occupants, and particularly the vehicle driver's eyes, from the sun.

It is known to suggest the incorporation of slim-form loudspeakers in an automobile sun visor. Such an arrangement has certain disadvantages, amongst which is the fact that conventional pistonic loudspeakers are directional and thus when incorporated in a sun visor may only be optimally positioned when the visor is in a certain position. It is indeed likely that the optimal acoustic positioning of the loudspeaker in the sun visor will occur only when the visor is in use, whereas for most of the time the visor is likely to be in its retracted position. In addition conventional loudspeakers, even of slim form, are relatively bulky and heavy and may present an unacceptable injury risk positioned close to the head of the vehicle occupants.

U.S. Pat. No. 4,362,907 of Polacsek describes a combination automobile sun visor and radio and speaker assembly, in which the speaker is a thin, bi-directional device.

SUMMARY OF THE INVENTION

According to the invention, there is provided a vehicle windscreen accessory comprising a body member, an adjustable support structure for the body member whereby the position of the body member can be adjusted, the body member comprising a mirror member and a loudspeaker having a bending wave panel-form acoustic member, the mirror member and panel-form member being integral.

From one aspect the invention is a vehicle sun visor comprising a sun shield member and an adjustable support structure for the shield member, whereby the position of the shield member can be adjusted from an inoperative position to at least one operative position, the shield member comprising a vanity mirror having a mirror member and a loudspeaker having a bending wave panel-form acoustic member, the mirror member and the panel-form member being integral. The shield member may define a hollow enclosure, in which one face of the panel-form member is enclosed to reduce or prevent sound radiation from that one face. The panel-form member may be a resonant member, e.g. according to WO97/09842 and U.S. counterpart application Ser. No. 08/707,012, filed Sep. 3, 1996. The sun visor may comprise an inertial electrodynamic vibration exciter on the panel-form member for applying bending wave vibration thereto.

The application of DM technology to the problem of providing a loudspeaker in an automobile sun visor, where the range of angles of adjustment of the visor causes large changes in response with conventional speakers, results in improved performance since a DM loudspeaker type has a highly consistent response over a range of angles.

The visor may be used for mobile telephony and/or for music reproduction, with distributed mode action and acoustic output resulting in superior clarity and intelligibility in this application. The panel-form device may also form or incorporate a microphone to enhance its application to mobile telephony.

From another aspect the invention is a vehicle rear view mirror comprising a body member and an adjustable support structure for the body member, whereby the position of the body member can be adjusted, the body member comprising a mirror member and a loudspeaker having a bending wave panel-form member, the mirror member and the panel-form member being integral. The body member may define a hollow enclosure, and one face of the panel-form member may be enclosed in the hollow enclosure to reduce or prevent sound radiation from that one face. The panel-form member may be a resonant member. The rear view mirror may comprise an inertial electrodynamic vibration exciter on the panel-form member for applying bending wave vibration thereto.

BRIEF DESCRIPTION OF THE DRAWING

The invention is described in detail below and diagrammatically illustrated, by way of example, in the accompanying drawing, in which.

BEST MODES FOR CARRYING OUT THE INVENTION

Figure 1:
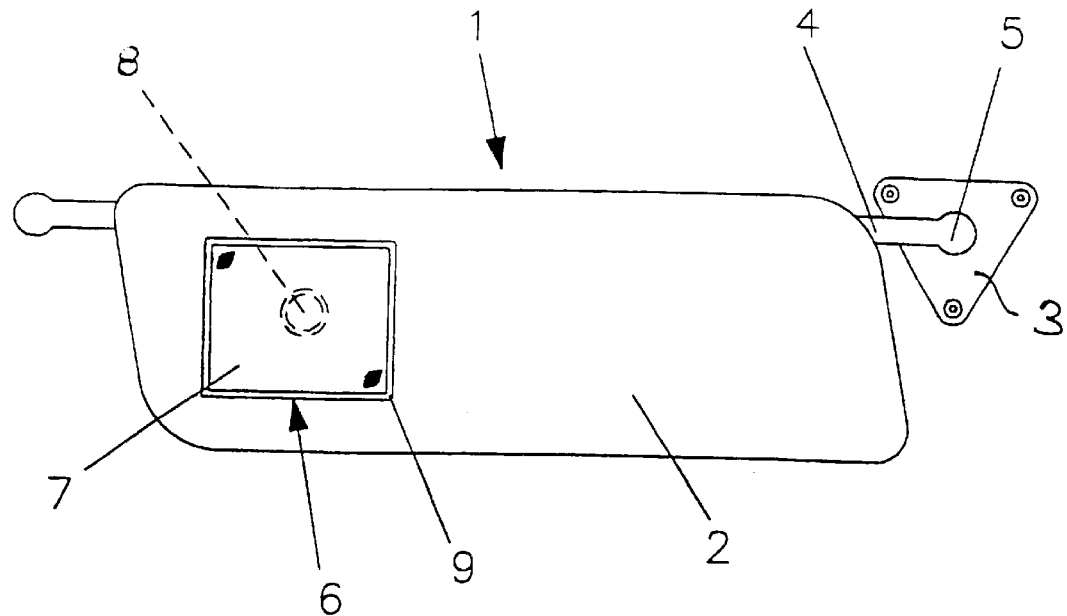
FIG. 1 is a face view of a vehicle sun visor.
Figure 2:
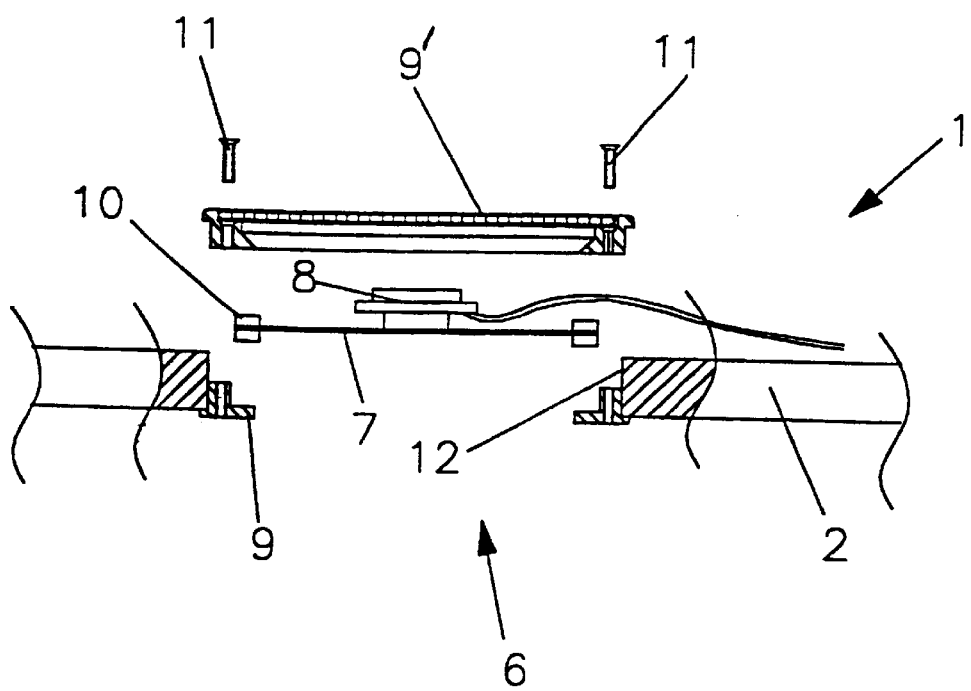
FIG. 2 is an exploded partial sectional view to an enlarged scale of the sun visor of FIG. 1.

In the drawing, and referring more particularly to FIGS. 1 and 2, there is shown an automobile sun visor (1) comprising a generally rectangular flat sun shield member or body (2) adjustably supported on a support structure comprising a mounting bracket (3) fixed to the automobile (not shown) adjacent to the upper corner of the windscreen or windshield thereof (not shown), the bracket (3) carrying an arm (4) by means of a friction-stabilised ball and socket joint (5) whereby the arm can be moved universally relative to the bracket (3). The arm (4) carries the shield member (2) such that the member (2) can pivot on the arm (4) in conventional manner so that the member (2) can be adjusted in position as required. The member (2) is formed with a generally rectangular aperture (12) in which a vanity mirror assembly (6) is mounted by means of frame parts (9,9') which engage opposed faces of the member (2) and which are secured together by fasteners (11). A mirror member (7) is clamped between the frame parts (9,9') and is held at its periphery in a resilient suspension (10) engaged between the frame parts (9,9'). It will be seen that the frame part (9) at the front of the mirror is open whereas the frame part (9') at the rear is in the form of an open grille.

The mirror member (7) is in the form of a stiff lightweight member, e.g. of plastics or glass or of a composite construction, which acts as a bending wave panel-form loudspeaker diaphragm and is driven in bending by an inertial electrodynamic vibration exciter (8) fed with an audio signal in conventional manner. In operation of the loudspeaker, the flexible movements of the panel (7) are very small and do not affect the function of the mirror. The loudspeaker is preferably a resonant device, e.g. of the kind described in WO97/09842 and counterpart U.S. application Ser. No. 08/707,012. Since the panel (7) is open at both its front and back, both faces can radiate an acoustic output.

Figure 3:
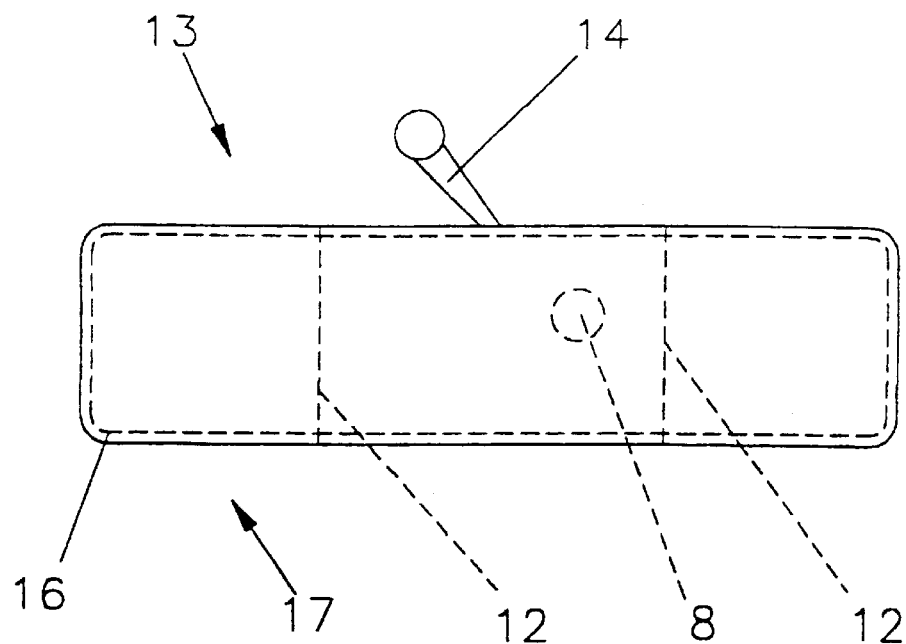
FIG. 3 is a face view of an automobile interior rear-view mirror.
Figure 4:
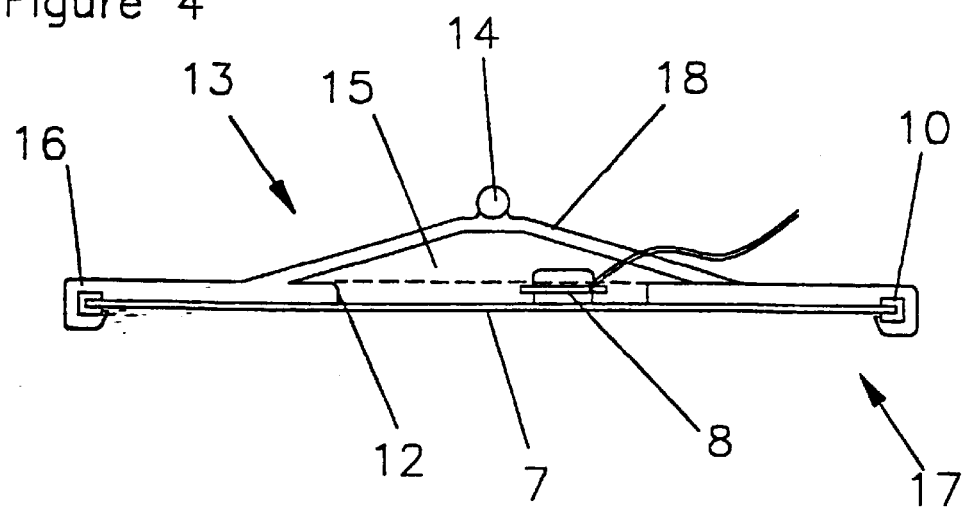
FIG. 4 is a sectional plan view of the rear-view mirror of FIG. 3.

In FIGS. 3 and 4 there is shown an automobile interior rear view mirror (13) comprising a body member (16) supported by a generally conventional adjustable support structure (14) whereby the attitude of the mirror can be adjusted as desired. The body (16) carries a mirror member (17) by means of peripheral resilient suspension 10. At its centre, the body is formed with an aperture (12) and at its rear the body is bulged at (18) to define a closed cavity (15) aligned with the aperture (12).

The central portion (7) of the mirror member (17) in the area of the aperture (12) is arranged to act as a bending wave panel-form loudspeaker—preferably a resonant device as aforesaid—and is acted on by an inertial electrodynamic vibration exciter (8) which applies bending wave vibration to the central portion of the mirror member to produce an audio output. The flexible movement of the central portion of the mirror is, however, too small to adversely affect the operation of the rear view mirror. The mirror may be of glass or plastics or may be of composite construction. In this arrangement, sound radiation from the rear face of the mirror is substantially attenuated by reason of its enclosure in the cavity (15).

Figure 5:
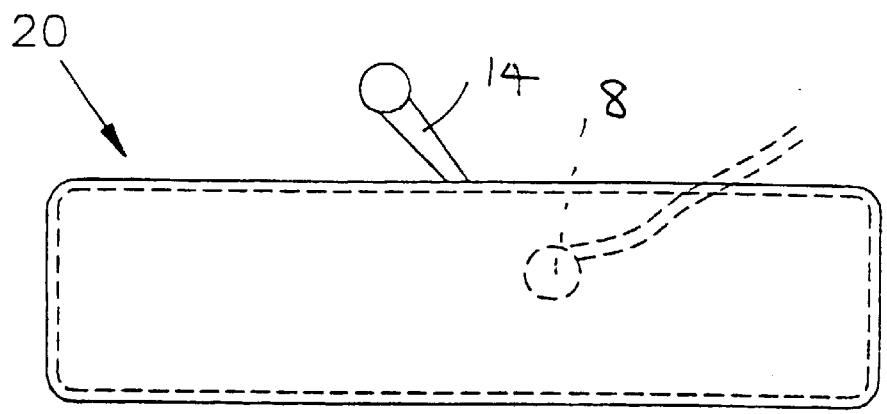
FIG. 5 is a face view of another embodiment of interior rear view mirror.
Figure 6:
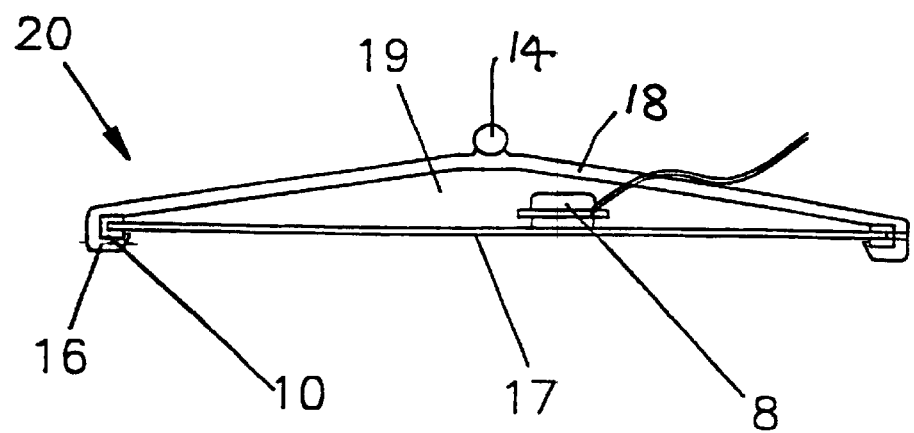
FIG. 6 is a sectional plan view of the rear view mirror of FIG. 5.

The rear view mirror (20) of FIGS. 5 and 6 is very similar to that of FIGS. 3 and 4, except in this case the whole of the body (16) forms a cavity (19) behind the front face of the mirror member (17). In this arrangement it may still be desirable that only part of the mirror member (17) is driven as a bending wave loudspeaker, and to achieve this it may be necessary to mass load the mirror to define the required acoustically active area, e.g. as described in WO97/09842 and U.S. Ser. No. 08/707,012.

The invention thus provides novel and effective mirror/vehicle windscreen accessory devices.

What is claimed is:

1. A mirrored vehicle windscreen accessory comprising a body member and an adjustable support structure for the body member whereby the position of the body member can be adjusted, the body member comprising a loudspeaker having a bending wave panel-form acoustic member, wherein the bending wave panel-form acoustic member is in the form of a mirror member.

2. A mirrored vehicle sun visor comprising a sun shield member and an adjustable support structure for the shield member, whereby the position of the shield member can be adjusted from an inoperative position to at least one operative position, the shield member comprising a loudspeaker having a bending wave panel-form acoustic member, wherein the shield member comprises a vanity mirror having a mirror member which forms the bending wave-panel form acoustic member of the loudspeaker.

3. A mirrored vehicle sun visor according to claim 2, wherein the shield member defines a hollow enclosure, and wherein one face of the panel-form member is enclosed in the hollow enclosure to reduce or prevent sound radiation from said one face.

4. A mirrored vehicle sun visor according to claim 2 or claim 3, wherein the panel-form member is a resonant member.

5. A mirrored vehicle sun visor according to claim 4, comprising an inertial electrodynamic vibration exciter on the panel-form member for applying bending wave vibration thereto.

6. A mirrored vehicle sun visor according to claim 3, comprising an inertial electrodynamic vibration exciter on the panel-form member for applying bending wave vibration thereto.

7. A mirrored vehicle sun visor according to claim 2, comprising an inertial electrodynamic vibration exciter on the panel-form member for applying bending wave vibration thereto.

8. A mirrored vehicle sun visor according to claim 2, comprising a microphone.

9. A vehicle rear view mirror comprising a body member and an adjustable support structure for the body member, whereby the position of the body member can be adjusted, the body member comprising a mirror member and a loudspeaker, wherein the loudspeaker comprises a bending wave panel-form acoustic member, and the mirror member acts as the bending wave panel-form acoustic member.

10. A vehicle rear view mirror according to claim 9, wherein the body member defines a hollow enclosure, and wherein one face of the panel-form member is enclosed in the hollow enclosure to reduce or prevent sound radiation from said one face.

11. A vehicle rear view mirror according to claim 9 or claim 10, wherein the panel-form member is a resonant member.

12. A vehicle rear view mirror according to claim 11, comprising an inertial electrodynamic vibration exciter on the panel-form member for applying bending wave vibration thereto.

13. A vehicle rear view mirror according to claim 10, comprising an inertial electrodynamic vibration exciter on the panel-form member for applying bending wave vibration thereto.

14. A vehicle rear view mirror according to claim 9, comprising an inertial electrodynamic vibration exciter on the panel-form member for applying bending wave vibration thereto.

* * * * *